United States Patent [19]

Mulholland et al.

[11] Patent Number: 5,042,891

[45] Date of Patent: Aug. 27, 1991

[54] ACTIVE DEVICE MOUNT ASSEMBLY WITH INTERFACE MOUNT FOR PUSH-PULL COUPLING TYPE OPTICAL FIBER CONNECTORS

[75] Inventors: Denis G. Mulholland, Lancaster; Ronald R. Schaffer; Gary N. Warner, both of Harrisburg, all of Pa.

[73] Assignee: AMP Incorporated, Harrisburg, Pa.

[21] Appl. No.: 541,675

[22] Filed: Jun. 21, 1990

[51] Int. Cl.[5] .............................................. G02B 6/42
[52] U.S. Cl. ....................................... 385/93; 385/88
[58] Field of Search ................. 350/96.2, 96.15, 96.18; 357/30, 72, 74

[56] References Cited

U.S. PATENT DOCUMENTS

| | | | |
|---|---|---|---|
| 4,186,995 | 2/1980 | Schumacher | 350/96.20 |
| 4,461,537 | 7/1984 | Raymer, II et al. | 350/96.2 |
| 4,726,648 | 2/1988 | Haberland et al. | 350/96.2 |
| 4,762,389 | 8/1988 | Kaihara | 350/96.21 |
| 4,767,179 | 8/1988 | Sampson et al. | 350/96.2 |
| 4,872,736 | 10/1989 | Myers et al. | 350/96.20 |

FOREIGN PATENT DOCUMENTS

| | | | |
|---|---|---|---|
| 0061243 | 9/1982 | European Pat. Off. | 350/96.2 |
| 60-21893 | 2/1985 | Japan . | |
| 61-53610 | 3/1986 | Japan | 350/96.15 |
| 62-26141 | 2/1987 | Japan . | |

Primary Examiner—John D. Lee
Assistant Examiner—John Ngo

[57] ABSTRACT

An active device mount assembly 1 comprises an interface mount 4 having front socket 9. Further included is an active device 5. The assembly 1 may also include a focusing element 6. The device 5 has an emission axis aimed along the axis of the optical focusing element. The assembly 4 further comprises a coupler element 7 aligned with the focusing element 6 and inserting into a precise depth into the socket 9 of the mount 4. Further the interface mount 4 provides means for attaching a fiber optic connector 3 where the fiber optic connector 3 has an alignment ferrule 66 and an optical fiber 10 extending therethrough. The alignment ferrule 66 abuts the coupler element 7 with the optical fiber 10 aligned to the center axis of the coupler element 7. The interface mount for attaching the fiber optic connector 36 further comprises a base 28 with an alignment sleeve 29 and at least two resilient catch pieces 30 extending from the base 28. The alignment sleeve 29 has longitudinal axis and axial bore encompassing the alignment ferrule 66 of the fiber optic connector 36. The resilient catch pieces 30 are of cantilever form extending parallel to and on opposing sides of the longitudinal axis of the alignment sleeve 29 and terminating in protrusions 32 and lip structures 33.

9 Claims, 4 Drawing Sheets

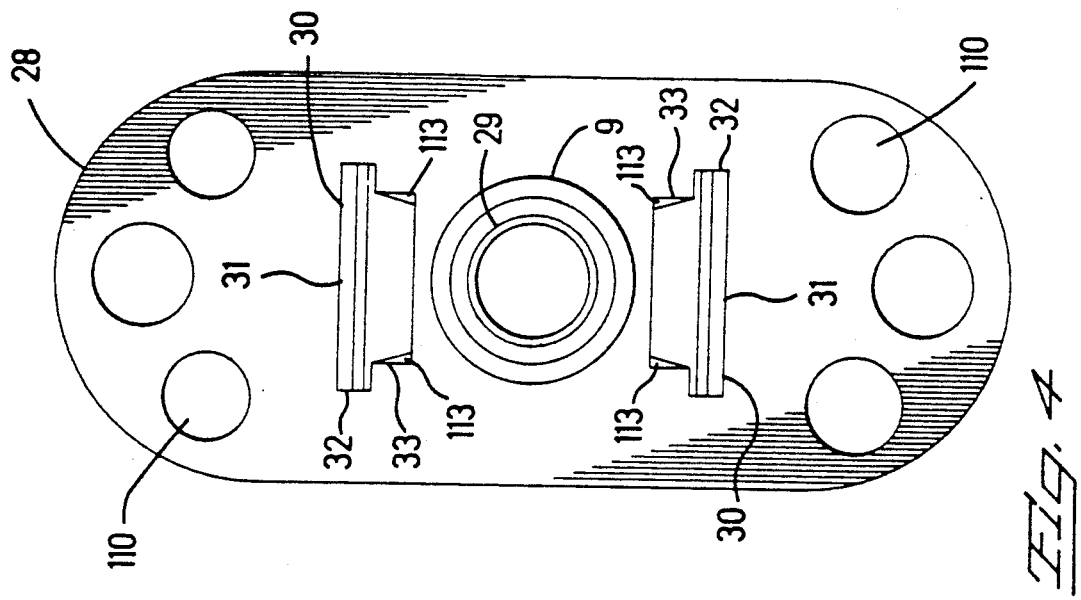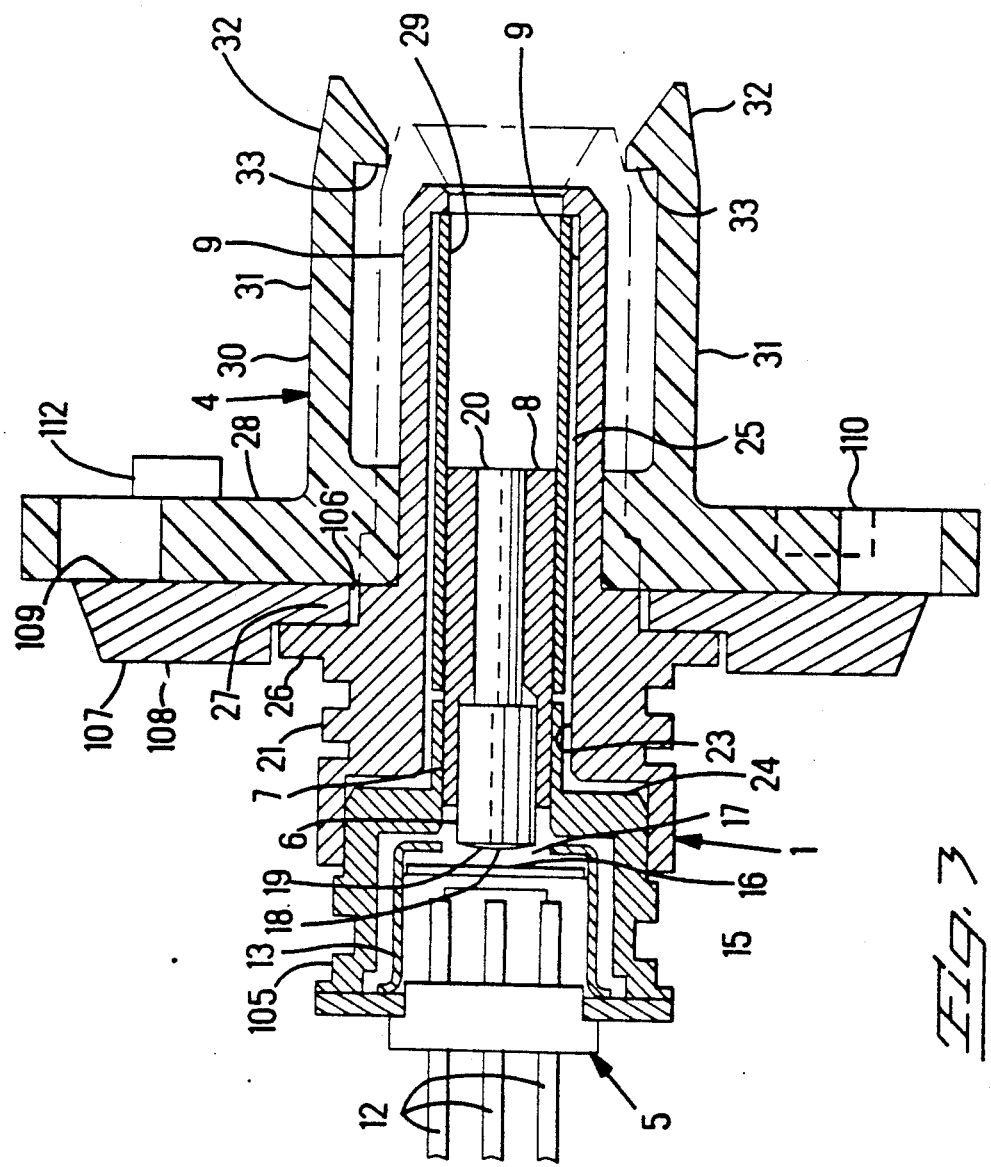

ACTIVE DEVICE MOUNT ASSEMBLY WITH INTERFACE MOUNT FOR PUSH-PULL COUPLING TYPE OPTICAL FIBER CONNECTORS

FIELD OF THE INVENTION

The present invention relates to an active device mount assembly that permits disconnectable connection of the active device to an optical fiber connector. Particularly, the present invention relates to an active device mount assembly that permits disconnect connection to a push-pull coupling type of optical fiber connector.

BACKGROUND OF THE INVENTION

Various types of optical fiber connectors are known for connecting two optical fibers. One type of such connectors is a pair of plugs with each fixed to an end of an optical fiber. These connectors may also include an adapter through which the optical fibers are interconnected with the optical axis of the plugs aligned. Umeki, et al, Japanese Showa 60-218932 discloses a push-pull coupling type of connector. It includes an adapter equipped with an alignment sleeve and resilient catch pieces. The pieces are in cantilever form with protrusions and a claw attached to the tip of the form. The connector also includes a frame that contains an integrated ferrule and a through passageway from the rear to the front of the ferrule. The frame has protruding parts that are caught by claws of the resilient catch pieces of the adapter. A resilient inner tube shaped in the form of a round tube has an inside diameter almost equal to the outside diameter of the optical fiber cable and an outside diameter almost equal to the hole in the rear portion of the plug frame. A cord tube has a flexible part at its front end which, when inserted into the hole in the rear of the plug frame, is secured to the frame by the bending of the flexible part. The plug frame also has a finger grip mounted on its outside with raised parts. When the ferrule of the plug frame is inserted into or pulled from the alignment sleeve, the raised parts of the plug frame contact the protrusions of the cantilever form and push the resilient claws to the outside allowing the protrusions to pass. The plug frame may have a finger grip housing which is able to slide forward and backward with respect to the plug frame and, additionally, which has raised parts which release the catch of claws on the protruding parts of the plug frame when the finger grip housing is moved backward.

The present invention relates to an active device mount (ADM) assembly with interface mount for disconnect connection of an active device to an optical fiber of the push-pull coupling type of connector such as disclosed by Iwasa, et al, Japanese Showa 62-26141; Kaihara, et al, U.S. Pat. No. 4,762,389; and Myers, et al, U.S. Pat. No. 4,872,736. Particularly, the invention relates to an active device mount (ADM) assembly for the push-pull coupling type of connector disclosed by co-pending patent application Ser. No. 491,755 filed Mar. 9, 1990. With ADM assemblies, optical emission from, for example a diode, or an optical signal to a detector, as the case may be, is transmitted successively through different transparent materials having different indices of optical refraction. A difficulty associated with conventional connector assemblies is that the light signal is scattered at the boundary between transparent materials of different indices. Another difficulty is that the light signal may reflect from surfaces of the materials or from a junction of one of the materials with an air gap. Particularly, if the active device is a laser diode, and the emission is reflected backward at low angles of incidence to the reflecting surface, such backward reflection can enter the laser diode and cause instability.

An advantage of the present invention resides in an ADM assembly which permits disconnect coupling of a push-pull coupling type optical fiber connector to an active device with substantially reduced backward reflection. Further, the ADM assembly is advantageous in providing a mount for optical fiber connectors of the push-pull coupling type where heretofore, no such device mount assemblies existed and it was required that such push-pull coupling type optical fiber connectors be connected to active devices through modifications of existing mounts with results which, at best, could be described as workable. According to the present invention, an ADM assembly provides a disconnect coupling for a push-pull coupling type optical fiber connector to an active device with the same accuracy of alignment as the coupling of an optical fiber to an optical fiber while eliminating backward reflection and unnecessary loss.

SUMMARY OF THE INVENTION

An active device mount assembly is provided which comprises an active device base and an active device mounted thereto and interface mount for attaching a fiber optic connector, the connector having an alignment ferrule and optical fiber extending therethrough. The interface mount comprises a base with the front socket extending therefrom The base has a longitudinal axis and an axial bore. Further, the interface mount includes at least two resilient catch pieces extending from the base. The catch pieces are in cantilever form extending parallel to and on opposing sides of the longitudinal axis of the front socket. The catch pieces terminate in protrusions and lip structures.

Further, the active device mount assembly may include an optical focusing element encompassed within the axial bore of the socket. The longitudinal axis of the focusing element will be aligned with the longitudinal axis of the axial bore of the socket. Further, the active device mount assembly may include a coupler element aligned with the focusing element and inserted to a precise depth into the socket of the assembly mount. Further, the coupler element may abut the alignment ferrule of the fiber optic connector with the optical fiber aligned to the center axis of the coupler element. The connecting means further includes an alignment sleeve encompassed by the front socket of the assembly mount. The longitudinal axis of the alignment sleeve extends parallel to the longitudinal axis of the socket. The two resilient catch pieces extend from the base and have cantilever arms. The cantilever arms extend parallel to and on opposing sides of the longitudinal axis of the alignment sleeves.

The active device mount assembly, in one embodiment, is for attaching an active device to a fiber optic connector where the connector comprises an optical fiber plug assembly. The plug assembly includes a plug housing with spacing through its body at a surface of a forward section. The plug assembly has defined exterior profile at a rearward section. A connector assembly is accommodated by and substantially within the plug housing. The connector assembly has, disposed at one exterior surface thereof, ridge, slot and tab. The ridge, slot tab are exposed through spacing at the surface of the forward section of the plug housing. Further included is a ferrule for fixing an optical fiber on a center axis thereof and accommodated within the connector assembly.

With this later embodiment, the interface mount for attaching the fiber optic connector attaches to the connector by insertion of the plug assembly so that each beveled leading edge face of the assembly contacts a respective leading edge of each lip of each resilient catch piece. This causes the catch piece to rise along the bevel of each face, over each ridge and to seat within each of the slots of the front shell portion, with the alignment ferrule of the fiber optic connector received within the alignment sleeve of the attaching means. This permits precise end face to end face alignment of the optical fiber of the fiber optic connector to the coupler element of the active device mount assembly within the socket of the interface mount.

BRIEF DESCRIPTION OF THE DRAWINGS

FIG. 3 is an enlarged elevation view, in section, of another embodiment of the active device mount assembly shown in FIG. 2.

FIG. 4 is a side view of the active device mount assembly of FIG. 3.

DESCRIPTION OF A PREFERRED EMBODIMENT

Figure 1:
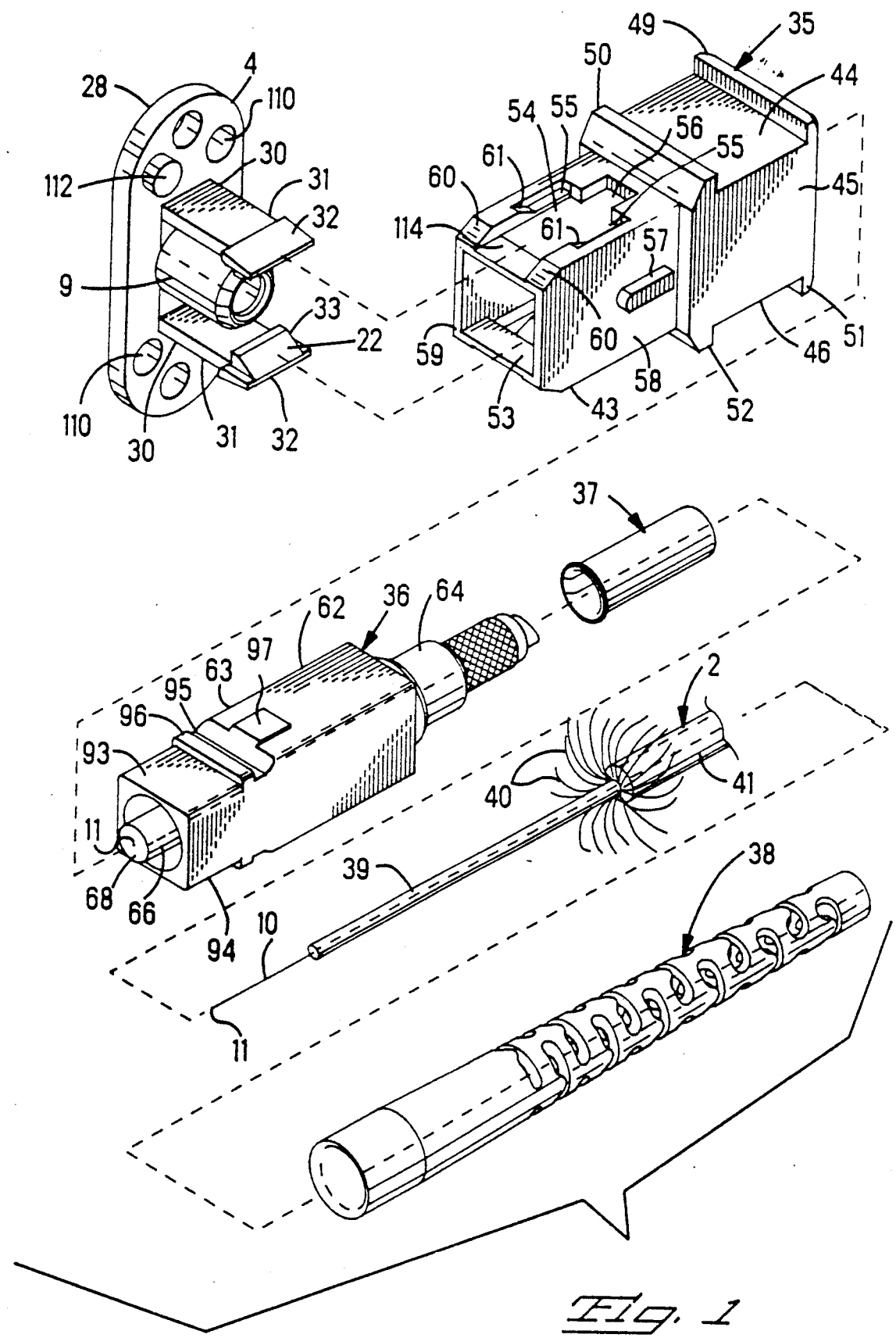
FIG. 1 is a perspective view, partially exploded, of the interface mount of an active device mount assembly, an optical fiber cable and a push-pull coupling type of connector.

The preferred embodiment of the present invention is an ADM assembly comprising an interface mount for attaching a fiber optic connector. The fiber optic connector described hereinafter is that disclosed in copending patent application Ser. No. 491,755 filed Mar. 9, 1990. With particular reference to FIGS. 1, 2, 3, and 4, an ADM assembly 1 for disconnectably coupling an optical fiber cable 2 of an optical fiber connector 3 includes an interface mount 4, and an ADM base 21 which includes the active device 5, an optical focusing element 6 facing the active device 5, for converting a diverging optical beam into a converging beam of optical energy, and an optical coupler element 7 receiving the beam. The optical focusing element 6 and the optical coupler element 7 are transparent, meaning that they are transmissive of optical energy emitted from or received by an active device. A rear end 8 of the coupler element 7 is at a precise depth in a socket 9 of the connector body 4 for physical contact with an end 11 of an optical fiber 10 disconnectably inserted into the socket 9. The coupler element 7 and the focusing element 6 are in physical contact to eliminate backward reflection of converging optical energy. The coupler element 7 is in physical contact with the optical fiber 10 to eliminate backward reflection of the focused beam of radiation from the optical fiber Electrical leads 12 of the circuitry project from a rear of the active device 5 for connection to a printed circuit board (not shown). The active device 5 has a cylindrical package, called a can 13, enclosing a semi-conductor 14 with a laser architecture that controls the operation of the active device 5 which, in this case, is a laser diode. An emission edge or emission facet 15 of the semiconductor 14 faces a window 16 of the can 13 at an emission end of the laser diode 5 The emission end 17 of the laser diode 5 emits optical energy comprised of a conical diverging beam of large numerical aperture It is an objective to change the large numerical aperture diverging beam into a small numerical aperture converging beam having a relatively small diameter that is readily matched to the beam acceptance conditions of the optical fiber 10.

The focusing element 6 is a radiant refractive index lens that absorbs a beam of optical radiation and will transform and converge the beam toward a focal point located at focus length of the focusing element 6. The absorption end 19 of the focusing element 6 is convex and has an anti-reflective coating 18. The convex absorption end 19 absorbs the diverging beam of optical radiation and transforms the beam into a converging beam. By addition of the coupler element 7, the converging beam will be focused to a focal point beyond the emitting end 20 of the focusing element 7. This beam at the focal point is magnified, meaning that it has a cross section of magnified size as compared with the size of the source emission at the emission end 17 of the laser diode 5. Further, it has a lower numerical aperture than that of the diverging beam from the laser diode 5 and also lower numerical aperture than would be achieved in air at the focal point. The coupler element 7 is a high purity silica rod and is in physical contact with the emitting end 20 of the focusing element 6 without an air gap therebetween. This eliminates backward reflection of the converging beam as at is absorbed by the coupler element 7. A transparent adhesive is used to bond the focusing element 6 and the coupler element 7 without an air gap. The coupler element 7 absorbs the converging beam and transmits the magnified converging beam into the diameter of optical fiber 10 held in the concentric ferrule 34 of plug 34 of complimentary connector assembly 36. The length of the coupler element 7 is selected so that the spot size gradually reduces along the length of the element 7. It obtains a spot size substantially equal to the diameter of the core of the optical fiber 10 at its end face 11. The coupler element 7 has an index of optical refraction greater than that of air and will refract the converging beam into a more gradually converging beam of higher magnification than if the beam were allowed to exit into the air.

The interface mount 4 of the ADM assembly 1 includes front socket 9 encompassing optical coupler 7 and optical focusing element 6. As shown, base 21 of assembly 1 has axially extending stepped bore 23, with enlarged diameter section 24 encompassing can 13 and smaller diameter section 25 encompassing the coupler 7 and focusing element 6 of assembly 1. The outer profile of base 21 is characterized by annular flange 26 which forms annular groove 27 with the base 28 of interface mount 4.

Figure 2:
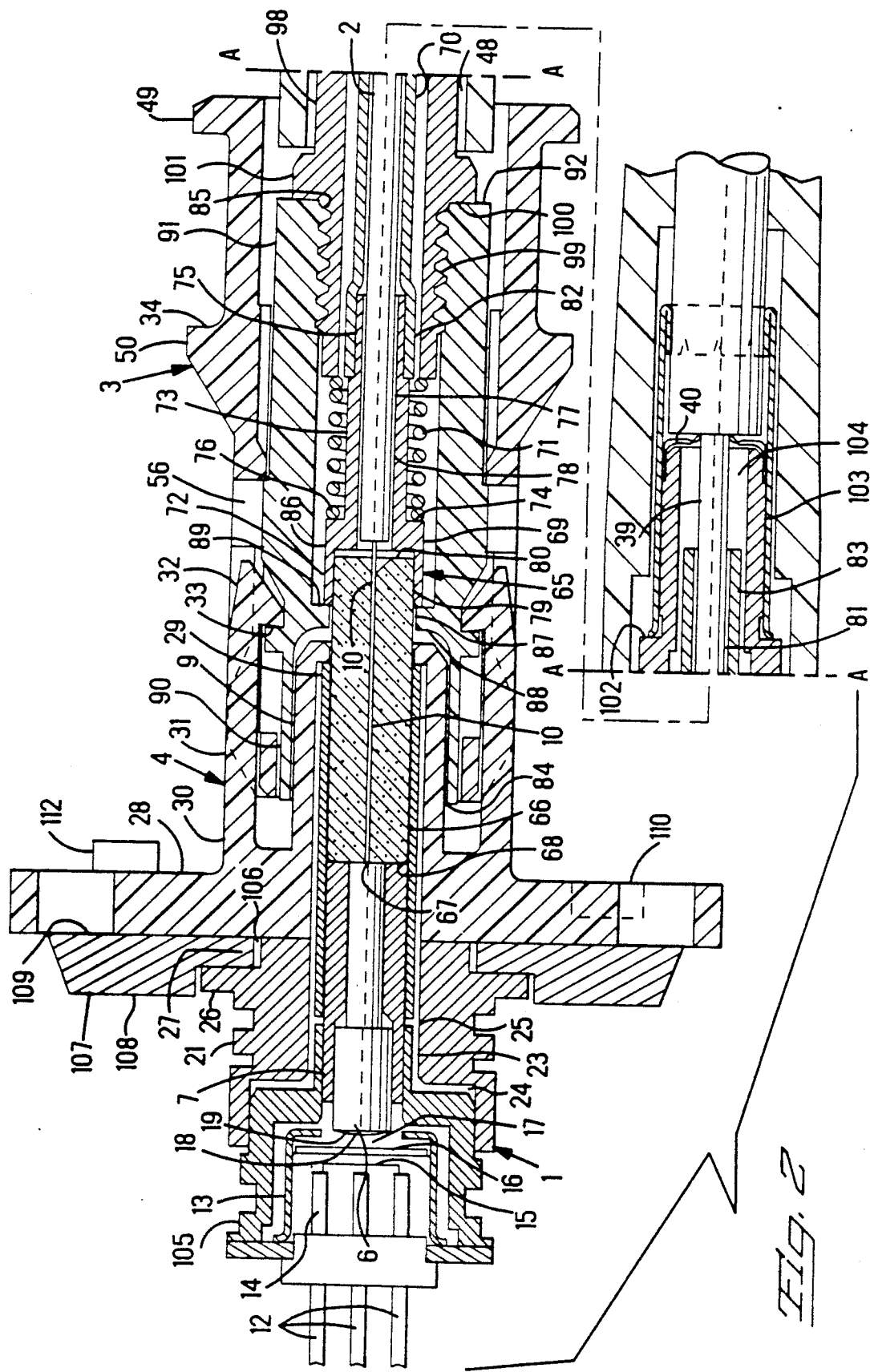
FIG. 2 is an enlarged elevation view, in section, of the active device mount assembly and the push-pull coupling type connector.

Shown in FIG. 2 is the preferred embodiment of the present invention, wherein the mount 4 includes base 28 and socket 9 extending forward from base 28 and encompassing alignment sleeve 29. The interface mount 4 provides means for connecting the active device mount assembly I to a fiber optic connector 3 of the push-pull coupling type. The connecting means includes base 28, socket 9 and resilient catch pieces 30. The connecting means may also include an alignment sleeve 29. The resilient catch pieces 30 extend from base 28 and are in the form of cantilever arms extending parallel to and on opposing sides of the longitudinal axis of front socket 9. The cantilever-shaped pieces 30 have tab sections 31, protrusions 32, and lip structures 33. In the embodiment shown, a single surface 22 of lip 33 is beveled. However in another embodiment lip 33 would have side bevels to facilitate lead-in to spacing 114 of plug housing 35 as interface mount 4 is connected to plug housing 35 as hereinafter described.

The ADM assembly 1 is constructed by inserting active device 5 into the open rear end of spacer portion 105. The optical coupler element 8 is loaded into the socket 9 of the mount 4 with close fit within the alignment sleeve 29. Focusing element 6 is inserted into coupler element 7 to fit with emitting face 20 flush with the rear end 8 of the coupler element 7. Spacer portion 105 with active device 5 fits within the stepped bore 23 of front portion 21 and the resulting assembly of active device 5, coupler 7, focusing element 6, spacer 105, and front portion 21 are inserted, from inside 108 to outside 109, through a port 106 of housing 107. Interface mount 4 is attached from the outside 109 with socket 9 encompassing alignment sleeve 29 with focusing element 6 and coupler element 7. Attachment of the mount 4 forms groove 27 between annular flange 26 of the ADM base 21 and base 28 and ADM base 21 and mount 4 clamp the wall housing 107 within the groove 27. Mount 4 is secured to housing 107 with screws, bolts or other suitable attaching means. Polarizing recesses 110 and nubs 12 are provided for oriented attachment to other elements such as an adapter for converting a simplex push-pull coupling system to duplex push-pull connector or to a shroud for the partial enclosing and protection for the catch pieces 30.

With specific reference to FIGS. 1 and 2, the fiber optic connector 3 includes a plug assembly 34 of the push-pull type comprising a plug housing 35 and a connector assembly 36. Shown also is crimp ferrule 37 and tubular strain relief body 38 for encompassing optical fiber cable 2. The cable 2 includes an elongated central optical fiber 10 concentrically encircled by a buffer 39, together comprising a buffer covered fiber 10, 39. The cable 2 further includes a load bearing portion in the form of elongated strength members 40 that extend lengthwise of the cable 2. The strength members 40 are distributed over the outer diameter of the buffer covered fiber 10, 39. The cable 2 further includes an outer jacket 41 of polymeric material enclosing the strength members 40. Parts of the cable 2 are cut away, as shown, to provide a length of fiber 10 projecting from the buffer 39 of the cable 2, and a length of the buffer covered fiber 10, 39 projecting from the strength members 40, and lengths of the strength members 40 projecting from the jacket 41. The buffer covered fiber 10, 39 is slidable within the jacket 41 and within the surrounding strength members 40.

As shown in FIGS. 1 and 2, the plug housing 35 of plug assembly 34 has rear section 42 and forward section 43. Rear section 42 is a tubular sleeve comprising four flat surface areas 44, 45, 46, and 47 forming passageway 48 for receiving connector assembly 36. Top surface 44 and bottom surface 46 have corresponding raised ridges 49 and 50 and 51 and 52 at edges of each surface 44 and 46.

Forward section 43 is integral with rear section 42 to form a single body, the plug housing 35. Forward section 43 is also a tubular sleeve with passageway 53. It has shaped openings 54 with notch 55 to receive and dispose slots 95, ridges 96 and raised tabs 97 of connector assembly 36 as hereinafter described and tabs 57 on opposite opposing faces 58 for fit to the slots of an adapter when utilized with an adapter assembly. Opposing faces 59 are characterized by leading bevel surfaces 60, spacing 114 between the surfaces 60, and following bevel surfaces 61 with utility as hereinafter described.

As shown in FIGS. 1 and 2, the connector assembly 36 includes a bipartite shell 62 comprised of a front plastic shell portion 63 and a rear metal shell portion 64. Also shown is a holder 65 for the optical fiber and buffer 10, 39, comprised of a ceramic alignment ferrule 66, having bore 67 and front end 68, and further including metal body 69, sheath 70 and biasing spring 71 of coil form.

The metal body 69 of holder 65 includes an enlarged front end 72 with an external hexagonal cross section, a reduced external diameter intermediate portion 73 intersecting a rear facing shoulder 74 of the enlarged front end 72, and a rear end 75 with a reduced external diameter. The coil spring 71 is assembled as shown, to encircle the reduced external diameter portion 73 with a front end 76 of the coil spring 71 engaged and biased against the shoulder 74. The metal body 69 further includes an axial passageway 77 extending from the rear end 75. The passageway 77 has axial bore 78 and an enlarged diameter counterbore 79 in the front end 72. The counterbore 79 is aligned to receive a rear end 80 of ceramic alignment ferrule 66 which is press fit into the counterbore 79.

The sheath 70 is a length of flexible plastic or metal tubing having a hollow interior 81, a front end 82 assembled to encircle the reduced diameter rear end 75 of the metal body 69, and a rear end portion 83. The sheath 70 is held onto the body 69 by friction or interference fit.

The front plastic shell portion 63 of connector assembly 36 includes an axial cavity 84 having an enlarged diameter rear end 85 that is internally threaded, an intermediate portion 86 having a hexagon shaped periphery, and a reduced diameter front portion 87 extending through an end wall 88 of the front body portion 63. Enlarged diameter rear end 85 is internally threaded for fit or rear shell portion 64 as hereinafter described. However, it should be pointed out that although this present embodiment shows attachment by threading, rear shell portion 64 may be attached to front shell portion 63 by other conventional means such as by means of glue or adhesive or ultrasonic connection of one part to the other. A rear facing, radially extending internal shoulder 89 is defined at the intersection of the diameter portions 86 and 87. A rectangular rod 90 with an enlarged internal diameter extends forwardly from the front of the end wall 88. Further, the front shell portion 63 includes a rear end 91 forming a rear facing external shoulder 92. Front shell portion 63 at the upper 93 and lower 94 surfaces of its outer profile has slots 95 and ridges 96 for engaging the lips 33 of resilient catch pieces 30 of mount 4, described below, and tabs 94 which impose outwardly. When connector assembly 36 is fitted within plug housing 35, slots 95 and ridges 96 are exposed by shaped openings 54 of the forward section 43 of plug housing 35. Tabs 97 nestle into notches 56 of the shaped openings 54 and ridges 96 fit into notches 55 to prevent connector assembly 36 from escaping out of plug housing 35.

The rear metal shell 64 of connector assembly 36 includes a front end 98, with an externally threaded forward portion 99. The front end 98 extends to a front facing external shoulder 100 defined by an exterior circumferential flange 101, a rear facing external shoulder 102 forward of a reduced external diameter end portion 103. The reduced diameter end portion 103 defines a cable anchoring portion. Rear shell portion 64 has axial passageway 104.

The connector assembly 36 is constructed according to the procedure disclosed in co-pending patent application Ser. No. 491,755 filed Mar. 9, 1990 which disclosure is incorporated into this application by reference. ADM assembly 1 is mounted to connector assembly 36 by inserting ceramic ferrule 66 through bore 105 of sleeve 29 and into socket 9 with ferrule 66 being received within the cylindrical alignment sleeve 29 of the mount 4. As the ferrule 66 is inserted, each beveled leading edge 60 of forward section 43 of connector assembly 36 contacts a respective beveled protrusion 32 of each resilient catch piece 30, causing the catch piece 30 to rise along the bevel 60 and causing each lip 33 to travel over each ridge 96 and to seat within each of slot 95 of front shell portion 63.

On disconnect of the fiber connector 36 from the mount 4, rearward force causes beveled following edges 61 to impose against each protrusion 32 of each catch piece 30, to lift each arm 31 thus disengaging each of lip 33 from respective slot 95 and ridge 96 of front shell portion 63 thereby permitting withdrawal of the plug assembly 34 from the active device mount assembly.

Other embodiments of the ADM assembly 1 are shown in FIGS. 3, 4, 5, and 6. In these Figures, like elements as to Figures 1 and 2 are identified by like numbers. In FIGS. 3 and 4, is shown an embodiment wherein the ADM base 21 includes socket 9 which, upon mounting, extends through port 106 of housing 107 to between catch pieces 31 of interface mount 4. Further, FIGS. 3 and 4 show an interface mount with lip structures 33 beveled inwardly at !13 to facilitate lead-in to the spacing 114 between beveled leading fases 60 of plug assembly 34 during attachment of assembly 1 to push-pull connector 36.

Figure 6:
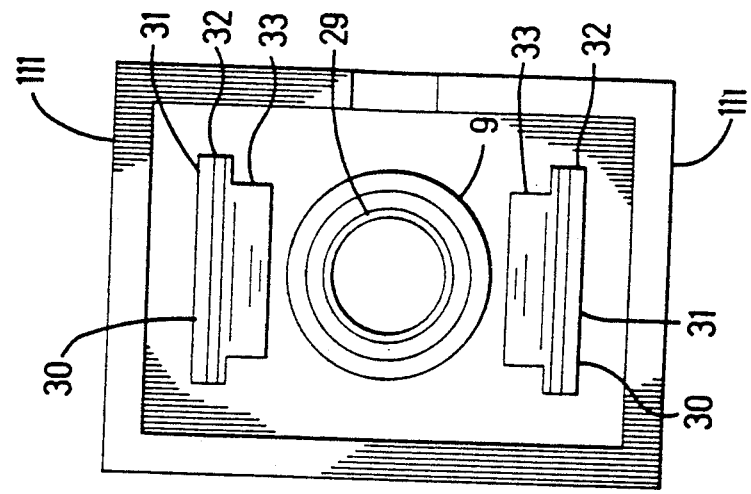
FIG. 6 is a side elevation view of the active device mount assembly of FIG. 3.
Figure 5:
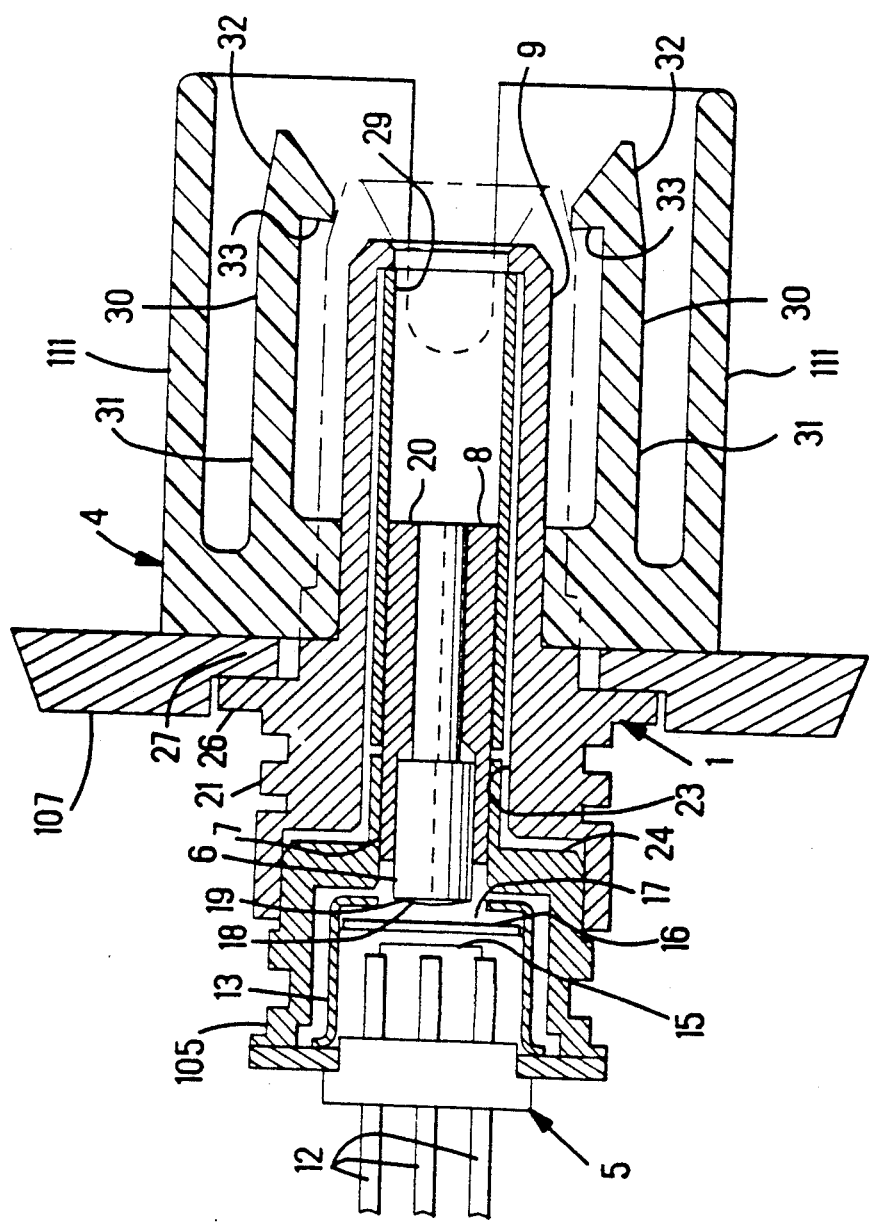
FIG. 5 is an enlarged elevation view, in section, of another embodiment of the active device mount assembly of FIG. 2.

In FIGS. 5 and 6, is shown an embodiment wherein interface mount 4 further includes a integral shroud 111 which forms a box-like housing around catch pieces 31 as part of the connecting means of interface mount 4.

While what has been described constitutes a presently preferred embodiment or embodiments of the invention, it should be recognized that the connector assembly 36 may take numerous other forms and the ADM assembly 1 may be utilized in other embodiments as well so long as the interface mount of the assembly 1 includes a base 28 with a socket 9 extending therefrom and having longitudinal axis and axial bore, and further including at least two resilient catch pieces 30 extending from the base and having cantilever form and extending parallel to and on opposing sides of the longitudinal axis of the socket 9. The catch pieces terminate in protrusions 3 and lip structures 33. For example, it is within the scope of the present invention that ADM base 21 and interface mount 4 be a single piece. Further, it is within the scope of the present invention, that the ADM base 2! and interface mount 4 be connected by press fit or heat treated or glued one to the other. Any means of attachment of one body to the other is within the scope of the present invention. Accordingly, it should be understood that the invention is to be limited only insofar as required by the scope of the following claims.

We claim:

1. An active device mount assembly for disconnectable connection with a fiber optic connector comprising, an active device base and an active device mounted thereto and interface mount for attaching a fiber optic connector having an alignment ferrule and optical fiber extending therethrough, said interface mount comprising: a base with a front socket extending therefrom and having a longitudinal axis and an axial bore; and at least two resilient catch pieces of cantilever form extending from the base parallel to and on opposing sides of the longitudinal axis of the front socket and terminating in protrusions and lip structures, the protrusions being constructed to contact respective beveled leading edges of the fiber optic connector and the catch pieces to rise along the leading edges, and causing each lip to travel over ridges of the fiber optic connector behind the leading edges and to seat within slots of the fiber optic connector behind the ridges.

2. The active device mount assembly of claim 1 further including an optical focusing element encompassed within the axial bore of said socket with longitudinal axis of the focusing element aligned with the longitudinal axis of the said axial bore; and an optical coupler element aligned with the focusing element and inserted to a precise depth into the socket of the assembly mount, and further abutting the alignment ferrule of said fiber optic connector with the optical fiber aligned to the center axis of said coupler element.

3. The active device mount assembly of claim 2 wherein the interface mount further includes an alignment sleeve encompassed by the front socket of said interface mount with longitudinal axis of said alignment sleeve extending parallel with the longitudinal axis of the socket.

4. The active device mount assembly of claim 3 wherein the alignment sleeve has annular beveled front edge.

5. The active device mount assembly according to claim 2 wherein each said catch piece comprises a tab body terminating in said protrusion and lip structure.

6. The active device mount assembly according to claim 2 wherein said base is characterized by at least one nub and one recess for fit to complimentary nub and recess of an attaching element.

7. The active device mount assembly according to claim 2 wherein said interface mount comprises said base additionally having, integral therewith, a shroud partially encompossing said resilient catch pieces.

8. The active device mount assembly of claim 2, 5, 6, or 7 wherein each of the connectors comprises; an optical fiber plug assembly, the plug assembly including a plug housing with spacing through its body at a surface of a forward section and with defined exterior profile at a rearward section; a connector assembly accommodated by and substantially within the plug housing, the connector assembly having disposed at one exterior surface thereof, ridge and slot and, in conjunction therewith tab; said ridge, slot and tab exposed through the spacing at the surface of the forward section of the plug housing, and ferrule for fixing the optical fiber on a center axis thereof and accommodated within the connector assembly.

9. The active device mount assembly according to claim 8 wherein said lip structures are beveled inwardly to facilitate lead-in to the spacing of said plug housing as said fixture is attached to said optical fiber connector.

* * * * *